UNITED STATES PATENT OFFICE.

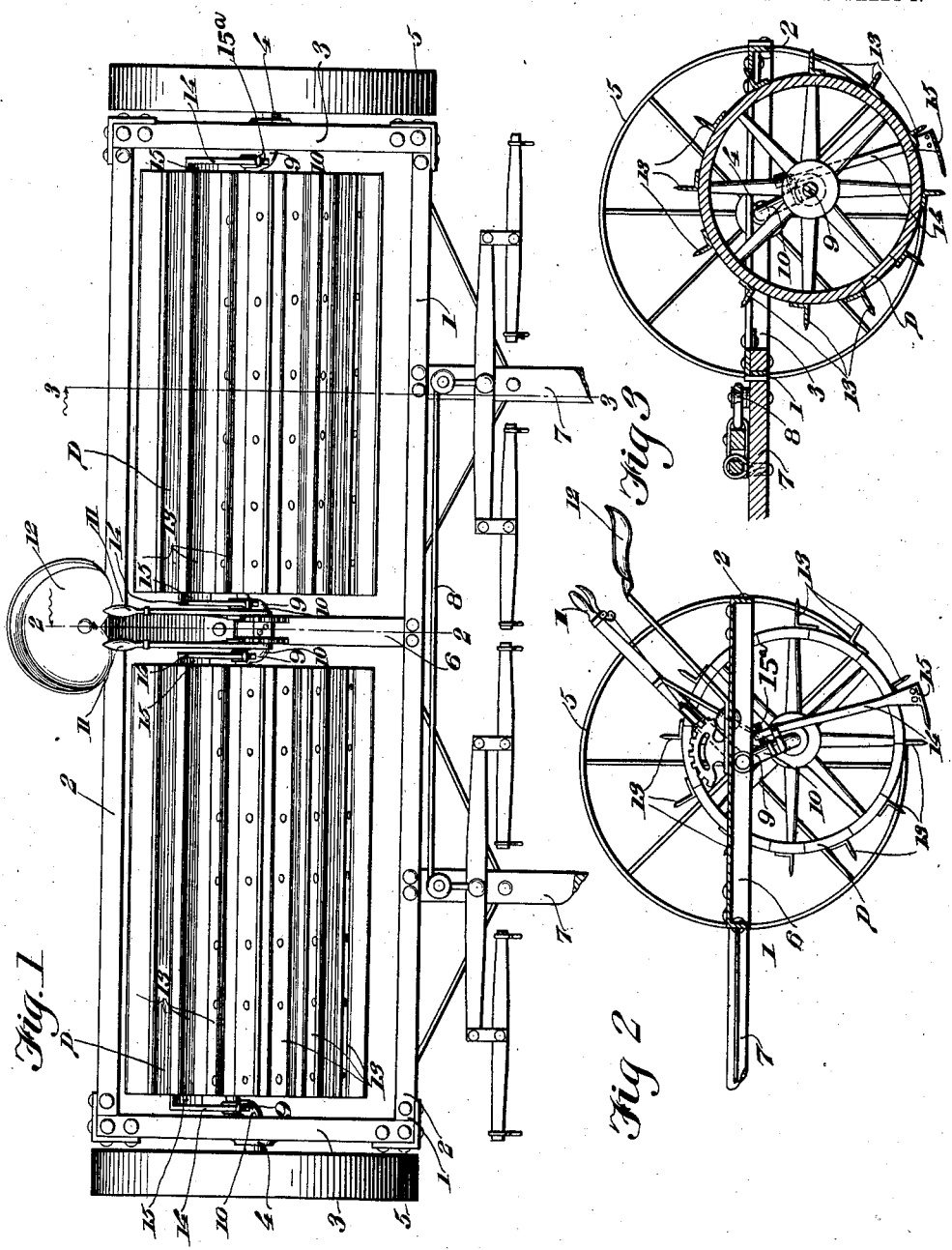

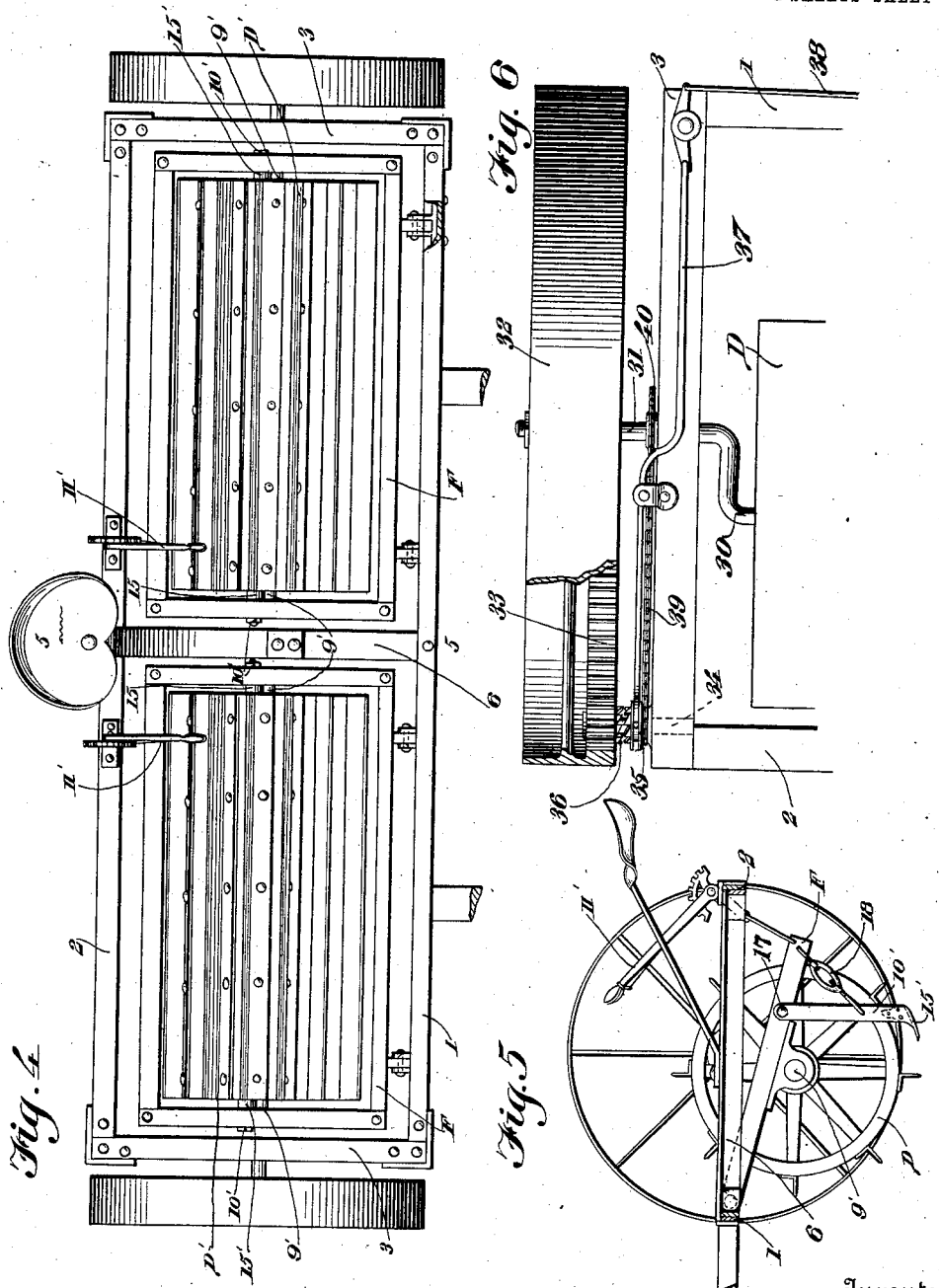

LOUIS E. SCOW, OF PORTAGE LA PRAIRIE, MANITOBA, CANADA, ASSIGNOR OF ONE-FOURTH TO GEORGE CHARLES SCOW, ONE-FOURTH TO THOMAS ALFRED MONTGOMERY, AND ONE-FOURTH TO THOMAS EDWARD MONTGOMERY, ALL OF PORTAGE LA PRAIRIE, CANADA.

SOIL-TILLING MACHINE.

1,023,043.   Specification of Letters Patent.   Patented Apr. 9, 1912.

Application filed April 15, 1911. Serial No. 621,284.

*To all whom it may concern:*

Be it known that I, LOUIS E. SCOW, a subject of the King of Great Britain, residing at Portage La Prairie, in the Province of Manitoba and Dominion of Canada, have invented new and useful Improvements in Soil-Tilling Machines, of which the following is a specification.

This invention relates to soil tilling machines of that class which are sometimes known as rotary plows.

The invention has for its object to produce a device of this character including a rotary drum equipped with knives or blades that engage the soil and which coact with an approximately horizontally disposed blade that cuts under the soil, thereby digging, stirring and agitating the soil and cutting weeds, stalks and roots to prepare the soil for the reception of seed.

A further object of the invention is to construct a machine of the character described adapted to operate especially upon summer fallow land to prepare the same for the reception of seed in an expeditious manner and without the expenditure of heavy labor.

A further object of the invention is to construct a machine of the character described in which the parts may be readily adapted to engage the soil at the desired depth and in which simple and efficient means are provided to effect the desired regulation.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the claims may be resorted to when desired.

In the drawings,—Figure 1 is a top plan view of a machine constructed in accordance with the invention. Fig. 2 is a vertical sectional view taken on the line 2—2 in Fig. 1. Fig. 3 is a vertical sectional view taken on the line 3—3 in Fig. 1. Fig. 4 is a top plan view illustrating a modified form of the invention. Fig. 5 is a vertical sectional view taken on the line 5—5 in Fig. 4. Fig. 6 is a detail plan view showing a further modification.

Corresponding parts in the several figures are denoted by like characters of reference.

The frame of the machine includes front and rear beams 1 and 2 and end beams 3, 3, said frame being of rectangular shape and suitably constructed of wood or metal. The end beams are provided with spindles 4 upon which the carrying wheels 5 are supported for rotation. Under the construction shown in the drawings the frame is provided with a center bar 6 connecting the front and rear beams, this being necessary in order to support the two drums D, D with which the machine is equipped. It will be understood, however, that within the scope of the invention a machine may be constructed with a single drum in which event the center bar 6 will be dispensed with. It will also be understood that by properly modifying the construction of the frame additional drums may be used if desired.

The frame is equipped with suitable means for the attachment of draft, said means having been shown as including tongues 7, 7 and a four-horse equalizer 8, but it is obvious that the draft means may be modified according to the necessities of the case.

Each of the drums D is supported upon a shaft or axle 9 having terminal cranks 10 which are pivotally connected with the frame, thus enabling the shaft or axle carrying the drum to be raised or lowered by means of a lever 11 which is suitably connected therewith, such lever being within convenient reach of the operator for whom a seat 12 is provided.

The drum D, which may be suitably constructed of wood, metal or other material or materials is equipped with a plurality of radially disposed knives or cutting blades 13 which are suitably spaced apart and which are adapted to dig into the soil as the drum rotates by engagement with the ground. Pivotally mounted upon the shaft or axle 10 adjacent to the ends of the drum are arms 14 carrying at their lower ends a knife or blade 15 which is approximately horizontally disposed and which may be slightly curved or concaved so as to be engaged or swept by the blades or cutters 13 of the drum when the latter rotates. The upper ends of the arms 14 may be provided with set screws 15ª bearing upon the rear sides of the cranks 10, thereby permitting the knife carrying arms 14 to be adjusted at various angles with reference to the cranks, thereby enabling the blade 15 carried by the arms 14 to be adjusted to the most advantageous position to coöperate with the knives 13 carried by the drum in various positions at which the latter may be adjusted by means of the lever 11.

It will be readily seen from the foregoing description that by properly manipulating the lever 11, the drum may be raised to a position above the ground for transporting the machine.

In operation the drum is lowered to the desired depth, and the blade-carrying arms 14 are likewise adjusted to cause the blade 15 to engage the soil at the desired depth. When the machine is drawn over the field, the drum or drums will be rotated by engagement with the soil; the blade 15 will cut below the soil, thereby severing the roots of weeds and stalks, while the knives 13 will dig into the soil, chopping the weeds and stalks and breaking and loosening the soil as it moves rearward over the blade 15, the blades 15 and 13 coacting in such a manner that roots and the like will be effectively cut and chopped. It is also evident that the soil will be effectively broken up and loosened.

Under the modified construction of the invention illustrated in Figs. 4 and 5, the main carrying frame composed of the members 1, 2, 3 and 6 supports auxiliary frames F which are hingedly connected with or adjacent to the front beam 1, each auxiliary frame being equipped with a shaft or axle 9' upon which a drum D' is supported for rotation. In this form of the invention the arms 10' carrying the blade 15' are pivotally mounted upon the frame F by pivotal members 17, and said arms may be adjusted at various angles by means of braces 18 adjustably connected therewith. For the adjustment of the frames F carrying the drum D', suitable means including a lever 11' will be provided. It will be readily seen that by this construction the knife carrying drum and the blade carrying arms may be adjusted substantially in the same manner and with the same result as is obtained by the construction shown in Figs. 1 to 3, inclusive.

In Fig. 6 a drum D has been shown as being supported for rotation upon a crank 30 of an axle 31, and the supporting wheel 32 is shown as having an internal gear 33. Supported for rotation upon the frame is a shaft 34 carrying a sprocket wheel 35 which may be connected for rotation with said shaft by means of a clutch 36 with which it may be thrown into engagement by means of a shipping lever 37 which is suitably connected with an operating rod 38. The sprocket wheel 35 is connected by a chain 39 with a sprocket wheel 40 upon the axle of the machine. It will be seen that by connecting the sprocket wheel 35 for rotation with its supporting shaft, motion will be transmitted from the internal gear 33 to the axle 31, thereby partly rotating the latter to elevate the drum D which is carried upon the crank 30.

The improved machine may be constructed at a moderate expense, and it has been found that with the draft of four horses a strip of land about ten feet wide may be effectively operated upon, thereby making the cost of tilling much less than when ordinary plowing is resorted to.

Having thus described the invention, what is claimed as new, is:—

1. In a machine of the character described, a main frame, rotary supporting means for the same, a drum having a plurality of radially disposed blades extending longitudinally thereof, means for supporting said drum for rotation and for vertical adjustment with reference to the main frame, arms associated with the supporting means of the drum, a blade carried by the said arms in parallel relation to the axis of the drum, said blade being disposed approximately at right angles to the blades carried by the drum and means for adjusting the blade carrying arms independently of the adjustment of the drum and for retaining said arms in adjusted position.

2. In a machine of the character described, a main frame, rotary supporting means for the same, a drum having radially disposed blades, means for supporting said drum for rotation and for vertical adjustment with reference to the main frame, a ground engaging blade supported in parallel relation to the axis of the drum and associated with the latter for vertical adjustment, means for effecting vertical adjustment of the blade independently of the adjustment of the drum, and means for supporting said blade in a position where its upper face will be cleared by the edges of the blades carried by the drum when the latter rotates.

3. In a machine of the character described, a main frame, rotary supporting means for the same, a drum having radially extending blades, means for supporting said drum for rotation and for vertical adjustment with relation to the main frame, a ground engaging blade having a cutting edge coacting with the cutting edges of the blades associated with the drum, and means associated with the supporting means of the drum for adjusting the ground engaging blade independently of the vertical adjustment of the drum and for supporting said ground engaging blade tiltably and adjustably.

4. In a machine of the character described, a main frame, a rotary supporting means for the same, a vertically adjustable drum having radially extending blades, arms pivotally associated with the supporting means of the drum, means for tilting said arms independently of the adjustment of the drum, and an approximately horizontal blade supported by said arms in spaced relation to the drum and adapted to be swept by the radial blades of the drum.

In testimony whereof I affix my signature in presence of two witnesses.

LOUIS E. SCOW.

Witnesses:
J. A. SHEARER,
B. W. FISHER.

Copies of this patent may be obtained for five cents each, by addressing the "Commissioner of Patents, Washington, D. C."